United States Patent

Nishimori et al.

[11] Patent Number: 5,939,170
[45] Date of Patent: Aug. 17, 1999

[54] MAGNETIC RECORDING MEDIUM

[75] Inventors: Ken-ichi Nishimori, Tokyo; Shoji Matsuda, Kanagawa; Jun-ichi Horikawa, Tokyo, all of Japan

[73] Assignee: Hoya Corporation, Tokyo, Japan

[21] Appl. No.: 08/819,129

[22] Filed: Mar. 17, 1997

Related U.S. Application Data

[63] Continuation of application No. 08/492,977, Jun. 21, 1995, abandoned.

[30] Foreign Application Priority Data

Dec. 28, 1993 [JP] Japan ................................. 5-335657

[51] Int. Cl.$^6$ ........................................................ G11B 5/72
[52] U.S. Cl. .................. 428/141; 428/212; 428/694 TR; 428/694 ST; 428/694 TP; 428/900; 428/65.5; 360/135
[58] Field of Search ..................... 428/141, 65.5, 428/694 TR, 694 ST, 694 TP, 900, 212; 360/135

[56] References Cited

U.S. PATENT DOCUMENTS

| | | | |
|---|---|---|---|
| 4,762,742 | 8/1988 | Sonoda et al. | 428/141 |
| 5,057,352 | 10/1991 | Ando et al. | 428/141 |
| 5,062,021 | 10/1991 | Ranjan | 360/135 |
| 5,169,703 | 12/1992 | Miyazaki et al. | 428/141 |
| 5,202,810 | 4/1993 | Nakamura et al. | 360/135 |
| 5,340,635 | 8/1994 | Isobe et al. | 428/141 |
| 5,427,833 | 6/1995 | Nakayama et al. | 428/64 |
| 5,441,788 | 8/1995 | Bloomquist et al. | 428/65.6 |
| 5,478,626 | 12/1995 | Mori et al. | 428/141 |
| 5,500,296 | 3/1996 | Inoue et al. | 428/408 |

FOREIGN PATENT DOCUMENTS

| | | |
|---|---|---|
| 2214014 | 8/1990 | Japan . |
| 3113823 | 5/1991 | Japan . |

OTHER PUBLICATIONS

Yufeng LI, et al.; "Effect Of Humidity On Stiction And Friction Of The Head/Disk Interface"; IEEE Transactions On Magnetics, vol. 26, No. 5, Sep. 1990; pp. 2487–2489.

*Primary Examiner*—Stevan A. Resan
*Attorney, Agent, or Firm*—Sughrue, Mion, Zinn, Macpeak & Seas, PLLC

[57] ABSTRACT

There is provided a magnetic recording medium comprising a nonmagnetic substrate (10, 20), at least one magnetic layer (30) having an upper surface (30a), and a protection layer (40) made of zirconia and having an upper surface (40a). The upper surface (30a) has a surface roughness of 3 nm or smaller defined by maximum height ($R_{max}$) while the upper surface (40a) has a surface roughness ranging from 5 nm to 60 nm. When a distance Zi indicates a degree of irregularities of the upper surface (40a) of the protection layer (40), a standard deviation of the heights Zi is 5.7 nm or smaller.

5 Claims, 9 Drawing Sheets

MAGNETIC RECORDING MEDIUM

This is a Continuation of application Ser. No. 08/492,977 filed Jun. 21, 1995 now abandoned.

BACKGROUND OF THE INVENTION

The present invention relates to a magnetic recording medium applicable to a hard disk device or the like for recording or reproducing information by the use of a magnetic head.

A magnetic recording device, such as a hard disk device, can record and reproduce information on a magnetic recording medium by means of a magnetic head. In a device of the type described, the magnetic head is brought into frictional contact with the recording medium when the device is activated or stopped. On the other hand, the magnetic head moves along the surface of the recording medium after the activation of the device and is kept to float just above that surface. This method has been mainly adapted to record and reproduce information with the magnetic head on the magnetic recording medium and will be referred to as a contact start stop (CSS) method.

The device using the above-mentioned CSS method inevitably has, in principle, tribological problems. Specifically, a head slider is completely brought into contact with the recording medium when the device is activated or stopped. In this event, the head slider is stuck to the recording medium because both the slider and the medium have surfaces subjected to mirror finish, which causes stiction to occur between the slider and the medium. The stiction may interrupt or hamper the rotation of a spindle on which the recording medium is loaded and often makes the operation of the device itself be difficult.

Another problem results from frictional force which occurs between the head slider and the recording medium kept in frictional contact with each other. This frictional force may give rise to abrasion and damages of the head slider and/or the recording medium.

Once such abrasion is advanced to a magnetic layer due to the friction, a so-called head crash phenomenon takes place and brings about destruction of the information recorded on the magnetic layer.

Tremendous studies and attempts have been made to overcome the above-mentioned problems of stiction and head crash. Specifically, an idea is to reduce a contact area on a head disk interface (HDI) between the head slider and the recording medium and to decrease stiction between the head slider and the recording medium. To this end, a mechanical texture is formed on a nonmagnetic base by using a lapping tape technique.

Alternatively, as disclosed in Japanese Unexamined Patent Publication No. 3-113823, a glass base is subjected to a chemical treatment (namely, chemical etching) to form desired irregularities on a surface of a base.

At any rate, an underlying layer and a magnetic layer are successively stacked on the base which has the irregularities on the base surface. Furthermore, a protection film is then stacked on the magnetic layer. This protection film serves to prevent the magnetic layer from being directly slidably contacted with the head slider, thereby to improve the abrasion resistance of the recording medium. For this purpose, the protection layer usually comprises carbon, metal oxide, carbide and nitride. A liquid lubricant, such as perfluoro polyether (PFPE) may be coated on the protection layer.

Requirements have been made to reduce a distance (hereinafter referred to as an effective floating height) between a magnetic sensor provided on the head slider and the upper surface of the magnetic layer of the medium, in order to comply with recent demands for a higher recording density of a magnetic recording device. To this end, a floating height must be kept low on the head slider side along the surface of the recording medium. On the side of the recording medium, it is required to reduce a height of the mechanical texture and, as a result, to diminish variations of the effective floating height on the whole of the magnetic recording medium and to achieve stable recording and reproduction of information. In addition, it may be necessary in some applications to reduce the thickness of the protection film deposited on the magnetic layer.

The above-mentioned method of forming the mechanical texture on the base is, however, liable to widely vary the heights of the irregularities on the magnetic recording medium. This makes it difficult to keep the effective floating height constant. Under the circumstances, when the floating height of the head slider itself is lowered, the head slider is abruptly contacted with the irregularities accidentally appearing on the magnetic recording medium. The floating stability is thus no longer achieved, which causes a problem of unstable recording/reproducing characteristics to take place. In addition, this results in a problem that damages are apt to be spread from accidental contact portions. These observations have taught that the recording medium should exhibit the unevenness which has protrusions of a uniform height and which has a small magnitude for reducing the effective floating height, to achieve a higher recording density of the magnetic recording device.

The surface irregularities with the protrusions of a uniform height have not brought into a complete solution to the conventional problems, although advantages have been gained in view of increasing the recording density. More specifically, another technical challenge related to stiction occurs in dependency on various environmental conditions of a magnetic recording device.

It is a recent trend that down-sizing computer systems makes it possible to use the computer systems at a wide variety of sites where computers are used. In such sites, there are included not only usual offices which are well air-conditioned but also houses or construction spots where temperature and humidity vary widely in an uncontrolled manner. Accordingly, a strong demand has been made for a magnetic recording device which has good weather resistance and which permits stable operation without depending on the environmental conditions.

Among others, humidity is one of the most important factors to satisfy the above-mentioned demand. Specifically, the amount of moisture adsorbed in the head slider and the medium becomes significant and directly controls the above-mentioned "stiction" between the head slider and the recording medium, as disclosed in IEEE Trans. Magn., Vol. 26, 2487 (1990). The stiction in a high humidity condition is very stronger in comparison with that in a condition at ordinary temperature and humidity. In the worst case, the spindle for mounting the magnetic recording medium is completely put into an inactive state.

It is well known by those skilled in the art to form irregularities on the surface of the substrate by means of texturing, as mentioned above, to mitigate the stiction in a high humidity condition. For example, Japanese Unexamined Patent Publication No. 4-89616 discloses a method of forming protrusions on the surface of the substrate to provide the protrusions of a uniform height.

Alternatively, Japanese Unexamined Patent Publication No. 2-214014 discloses a texturing technique of forming surface protrusions that are dispersed comparatively at random.

The former technique can reduce a contact pressure imposed on a single protrusion at the HDI and can improve the head crash resistance. However, water droplets or vapor may easily be coagulated in a high humidity environment, which facilitates occurrence of the stiction.

On the other hand, the latter technique is more effective to prevent occurrence of the stiction. However, only the small number of protrusions can be brought into contact with the head slider, which results in a local increase of the surface pressure imposed on these protrusions. The local increase of the surface pressure may introduce a local damage on the magnetic recording medium. In addition, the local damage may be spread from a portion at which the surface pressure is increased.

As mentioned above, conflicts take place between a reduction of the stiction and an increase of the recording density, when both of them are accomplished by reducing the surface roughness of the recording medium. Accordingly, a strong requirement is directed to a magnetic recording medium that enables a small floating height of the head slider and a reduction of the stiction even in a high humidity condition.

SUMMARY OF THE INVENTION

It is an object of the present invention to provide a magnetic recording medium which is capable of suppressing stiction even under a high humidity condition.

It is another object of this invention to provide a magnetic recording medium of the type described, which is capable of effectively avoiding a head crash phenomenon.

It is still another object of this invention to provide a magnetic recording medium of the type described, which enables a low floating height of a head slider.

In order to overcome the above-mentioned problems, a magnetic recording medium according to the present invention comprises a non-magnetic substrate, at least one magnetic layer provided on the non-magnetic substrate, and a protection layer disposed directly on the upper surface of the magnetic layer. More particularly, the magnetic layer comprises an upper surface having a surface roughness of 3 nm or smaller defined by the maximum height ($R_{max}$) provided by protrusions formed thereon. The magnetic recording layer has an average surface on the upper surface thereof and a sectional outline corresponding to protrusions on the upper surface when the average surface is cut along a plane perpendicular to the average surface. The sectional outline has an average line which may be specified by a curved line or a straight line. The average line is decided by defining a nominal average contour and by calculating square sums of differences between the sectional outline and the nominal average contour within a sampled portion and by selecting a minimum one of the square sums. In addition, selection is also made about the protrusions which exceeds the average line to pick up a maximum or highest one of the heights that is assigned with "1". Therefore, the protrusions of the maximum height is specified by Z1. Likewise, the protrusions are successively numbered from a second highest one to a lowest one within the sampled region. Thus, the protrusions, n in number, are selected in the sampled region. In this event, the maximum height Z1 falls within a range between 5 nm and 60 nm, and a standard deviation of the heights Zi (i=1 to n) is 5.7 nm or smaller.

In the above-mentioned aspect, an intermediate layer may be provided between the protection layer and the magnetic layer. When the intermediate layer is formed, the surface roughness thereof is 3 nm or smaller when measured by $R_{max}$.

The protection layer may be formed of zirconia (zirconium oxide).

In the present invention, the magnetic layer or the intermediate layer has the upper surface contacting with the lower surface of the protection layer. The upper surface has a maximum height surface roughness of 3 nm or smaller. In addition, the heights Zi on the upper surface of the protection layer are in the range between 5 nm and 60 nm. It has been confirmed that the stiction and the head crash can be avoided effectively while a narrow floating height of the head slider can be accomplished. In addition, this structure can readily be manufactured through industrial production.

The probable reasons of these favorable results are described more in detail below. The maximum height surface roughness of 3 nm or smaller makes it possible to form fine irregularities on the magnetic layer. This permits significant restriction on the variation of the distance between the magnetic head and the magnetic layer, i.e., the effective floating height, during recording and reproducing operation. As a result, high density recording and reproduction can be made in a stable manner.

In addition, the present invention eliminates the necessity of texturing on the surface of the substrate before formation of the magnetic layer or the intermediate layer. Accordingly, there is no possibility of forming an undesired protrusion which otherwise may be caused during the texturing. This in turn permits simplification of the manufacturing process. Further, the magnetic layer (or the intermediate layer if provided) has a smooth upper surface. Therefore, the surface roughness of the magnetic or intermediate layer is substantially independent of the surface roughness of the protection layer formed thereon. This facilitates control of the surface roughness, and it becomes possible to control the surface roughness readily in the range from 5 nm to 60 nm, defined by Z1, on the protection layer provided on the magnetic layer or the intermediate layer having the above-mentioned surface roughness. The surface roughness described above may be achieved by means of selecting materials and deposition conditions for the protection layer to be formed through, for example, a typical film deposition technique such as sputtering. In addition, the protection layer of the type described may be formed by using the same deposition technique as those used for depositing the magnetic layer and the intermediate layer. As a result, a continuous production line used in, for example, in-line sputtering may be available to form the protection layer following the magnetic layer and the intermediate layer. In this event, the intermediate layer when provided contributes to the improvement of the adhesion between the magnetic layer and the protection layer. The intermediate layer also permits formation of more uniform and fine protrusions on the surface of the protection layer formed thereon. This ensures the effect of preventing the stiction and further improves the durability and the anti-corrosion properties.

As mentioned above, the upper surface of the magnetic layer or the intermediate layer has the maximum height surface roughness $R_{max}$ of 3 nm or smaller. The maximum height surface roughness of larger than 3 nm causes difficulty in significantly restricting the variation of the effective floating height during the recording and reproducing operation. As a result, it becomes difficult to control the surface roughness of the protection layer formed thereon into a predetermined range. The surface roughness (Z1) of smaller than 5 nm in the protection layer increases a possibility of causing the stiction. On the other hand, the surface roughness (Z1) of larger than 50 nm may inhibit reduction in floating height of the head slider.

The depth of the protrusions on the protection layer is 5.7 nm or smaller in the standard deviation ($\sigma_{Zi}$) of the heights Zi. As a result, the stiction is restricted more effectively to improve the wear resistance of the recording medium, providing the durability for a long term usage. The floating stability of the head slider is improved when $\sigma_{Zi}$ is equal to or smaller than 1.0 nm in an atmosphere of 50% or lower in relative humidity (RH). The head slider can float just over the surface and a recording/reproducing signal can thus be transmitted at a high signal to noise ratio that is an essential factor for high recording density. As a result, the head crash resistance is improved. On the contrary, the standard deviation of 1 nm$\leq \sigma_{Zi} \leq$5.7 nm restricts the stiction in a high humidity condition where the humidity is higher than 50% RH. The resultant recording medium has a satisfactory head crash resistance without any problems by the practical considerations. A possible reason for this is in the fact that not all protrusions contact with the surface of the head slider, providing a smaller area for the water droplets to be coagulated at HDI even in a high humidity condition and reducing forces of water acting over the head slider and the medium (hereinafter referred to as meniscus forces).

As mentioned above, the standard deviation $\sigma_{Zi}$ has the upper limit of 5.7 nm. When the standard deviation exceeds this value the variation of the protrusions on the medium deteriorates the floating stability of the head slider. As a result, recording and reproduction of the information can be achieved only in an unstable manner. In addition, the smaller number of protrusions contact with the head slider, which increases a surface pressure imposed on a single protrusion. The head crash resistance is thus deteriorated significantly.

The protection layer when formed of zirconia has a desired hardness as the protection layer. It also provides excellent adhesion properties to the magnetic layer and the intermediate layer. Zirconia permits stable industrial production of the protection layer having high mechanical and chemical durability as well as high wear resistance through a simple method including a typical deposition such as sputtering.

The foregoing and other objects as well as features and advantages of the present invention will become more apparent from the following description and accompanying drawing in which:

DESCRIPTION OF THE PREFERRED EMBODIMENTS

First, description will be made about a main structure of magnetic recording media according to Examples and Comparative Examples and a process of manufacturing the same. Then, a surface roughness will be considered in connection with the above-mentioned media and comparative description will be also made about tribological properties.

Figure 1:
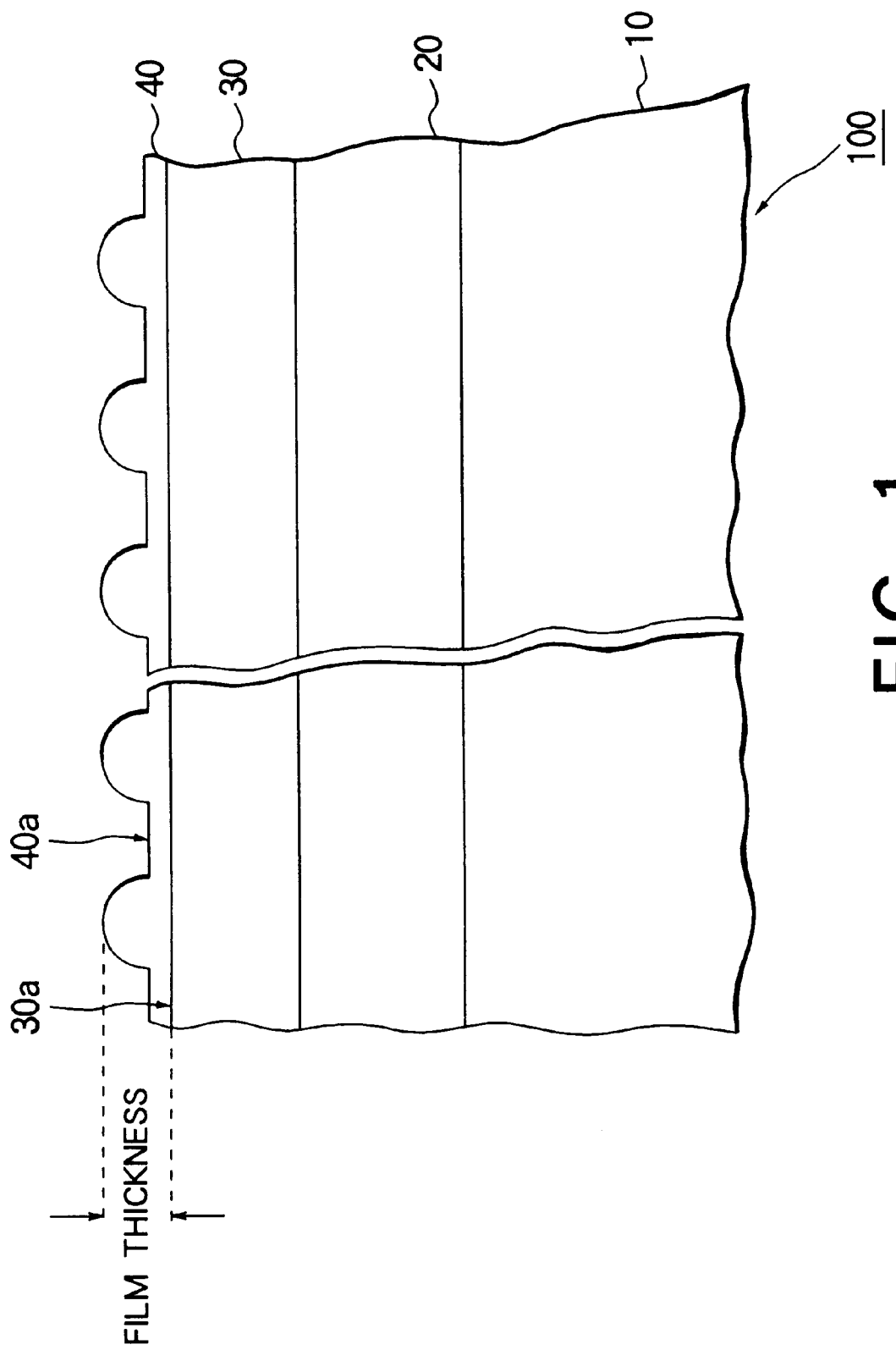
FIG. 1 is a sectional view of a portion of a magnetic recording medium obtained according to Examples 1 through 36 of the present invention.

First Embodiment:

Referring to FIG. 1, Examples 1 through 18 were manufactured as a magnetic recording medium 100 according to a first embodiment of the present invention. Herein, the magnetic recording medium according to the first embodiment includes a nonmagnetic base 10 and a nonmagnetic underlying layer 20 both of which form a nonmagnetic substrate. In addition, a magnetic layer 30 and a protection layer 40 are successively formed on the nonmagnetic substrate in this order. In this event, a lubricant film (not shown) may be coated on the protection layer 40.

The base 10 is prepared in the following manner. A glass base of 65 mm in diameter is polished to provide a mirror finished surface having a maximum height surface roughness of 3 nm or less. This glass base is subjected to ultrasonic cleaning for 5 minutes with pure water and isopropyl alcohol (IPA) having purity of 99.9% or higher in a cleaning device. The base is then left in an IPA vapor for 1.5 minutes and dried.

The underlying layer 20 of Cr has a thickness of 100 nm while the magnetic layer 30 of CoNiCr has a thickness of 50 nm. The protection layer 40 is formed by a partially-stabilized zirconia.

Herein, three different protection layers were prepared which had thicknesses of 10 nm, 20 nm, and 60 nm (Table 1 shown later). The underlying layer 20 and the magnetic layer 30 were successively formed by the use of an RF magnetron sputtering technique under the following sputtering conditions:

| | |
|---|---|
| Atmospheric Gas | Argon (Ar) gas of 99.9% in purity |
| Gas Pressure | 10 mTorr |
| Gas Flow Rate | 10 SCCM |
| Input Electric Power | 200 W |
| Back Pressure | $10^{-7}$ Torr |
| Heating Substrate | no |

The protection layer 40 was also successively formed through the RF magnetron sputtering technique, following the deposition of the underlying layer 20 and the magnetic layer 30. Thus, provision was made about first through third Examples 1 to 3 that have the protection layers of the thicknesses of 10 nm, 20 nm, and 60 nm, respectively. The sputtering conditions were similar to those described above except that the type of the atmospheric gas and the gas pressure were changed (see Table 1) in order to obtain fourth through eighteenth Examples. The tenth through the eighteenth Examples have thus been prepared.

| | |
|---|---|
| Atmospheric Gas | Argon (Ar) gas of 99.9% in purity or a mixed gas of Ar gas of 99.9% in purity and oxygen ($O_2$) gas in the equivalent purity. |
| Gas Flow Rate | 10 SCCM for Ar gas |
| | Ar:$O_2$ = 10 SCCM:5 SCM for mixed gas |
| Power | 200 W |
| Back Pressure | $10^{-7}$ Torr |
| Heating Substrate | no |
| Sputtering Target | $ZrO_2$—$Y_2O_3$ (3 mol %) |
| Average Particle Diameter | 0.2–0.3 μm |

At any rate, the first through the eighteenth Examples 1 to 18 shown in Table 1 were prepared by changing the conditions from one to another.

EXAMPLES 19 through 36

Examples 19 through 36 were prepared like Examples 1 through 18 in similar sputtering conditions except that each base 10 was heated at 100° C. during sputtering the protection layer 40. Besides the temperatures, Examples 19 through 36 were manufactured like in Examples 1 through 18. The sputtering conditions are set forth in Table 1.

EXAMPLES 37 through 54

Figure 2:
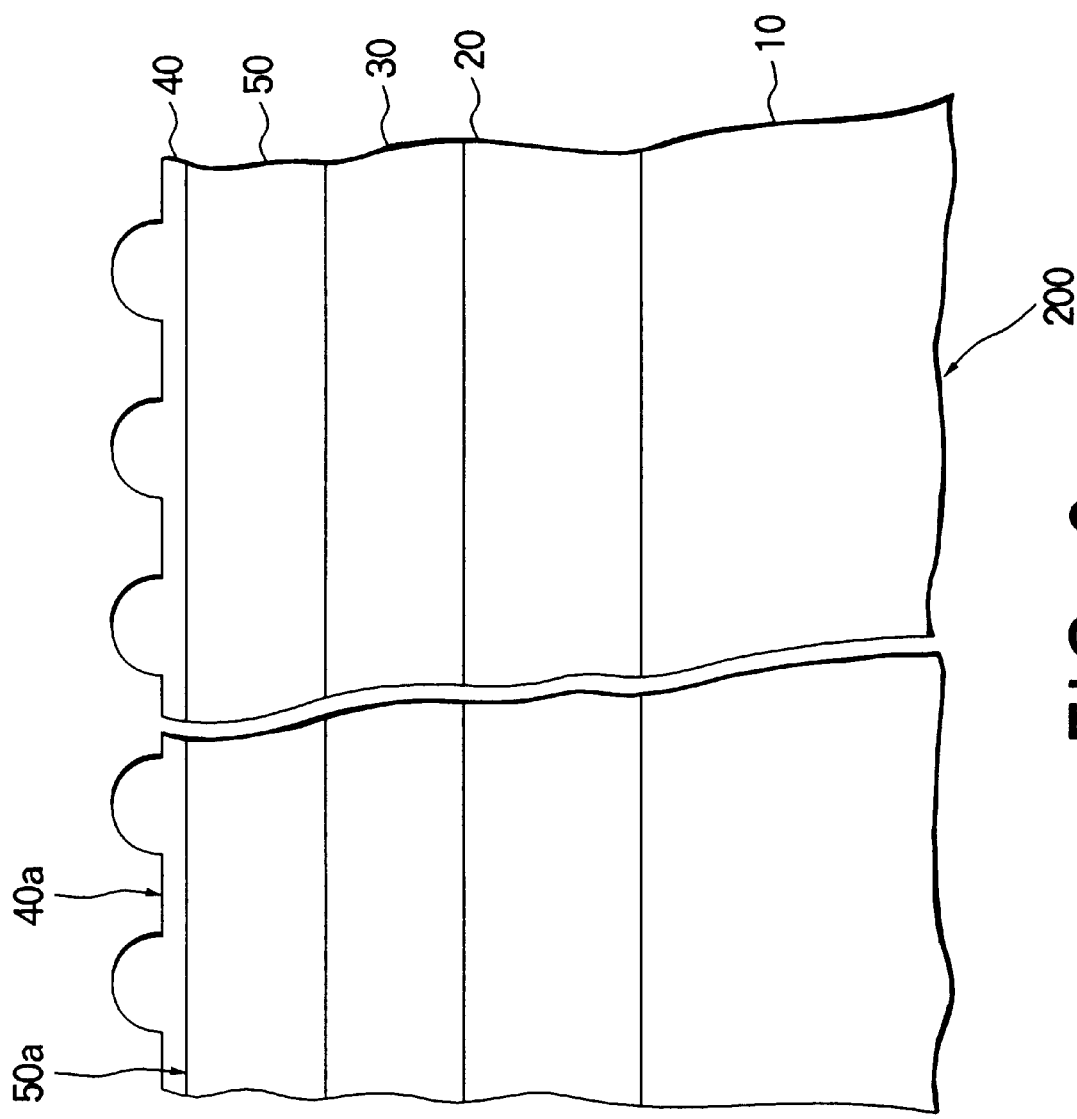
FIG. 2 is a sectional view of a portion of a magnetic recording medium obtained according to Examples 37 through 72 of the present invention.

Referring to FIG. 2, a magnetic recording medium 200 according to a second embodiment of this invention is exemplified as Examples 37 to 54 and is similar in structure to the magnetic recording medium 100 according to the first embodiment except that a glass-like layer 50 is provided as an intermediate layer between the magnetic layer 30 and the protection layer 40. This magnetic recording medium 200 was prepared in the same manner as in the magnetic recording medium 100. More specifically, the protection layer 40 is formed on the glass-like layer 50. The glass-like layer 50 is formed on the magnetic layer 30 in the magnetic recording medium 100 and serves as the intermediate layer in Examples 37 through 54. This is the only difference between the magnetic recording media 100 and 200. Except for that difference, both magnetic recording media were identical in structure with each other. The correspondence will be set forth in Table 1 below.

The glass-like layer 50 may be formed by a film of silicon oxide ($SiO_2$) having a film thickness of 10 nm. This layer was prepared through the same deposition technique under the same conditions as those used for depositing the non-magnetic underlying layer 20 and the magnetic layer 30 in Examples 1 through 18 except that the sputter target of $SiO_2$ was used.

TABLE 1

PROTECTION LAYER SPUTTERING CONDITIONS

| | | | Non-heated Substrate | | Substrate heated at 100° C. | |
|---|---|---|---|---|---|---|
| Atomspheric Gas | Gas Pressure (Torr) | Thickness (nm) | Magnetic layer | Intermediate layer | Magnetic layer | Intermediate layer |
| Ar | 10 | 10 | Example 1 | Example 37 | Example 19 | Example 55 |
| | | 20 | Example 2 | Example 38 | Example 20 | Example 56 |
| | | 60 | Example 3 | Example 39 | Example 21 | Example 57 |
| | 20 | 10 | Example 4 | Example 40 | Example 22 | Example 58 |
| | | 20 | Example 5 | Example 41 | Example 23 | Example 59 |
| | | 60 | Example 6 | Example 42 | Example 24 | Example 60 |
| | 40 | 10 | Example 7 | Example 43 | Example 25 | Example 6L |
| | | 20 | Example 8 | Example 44 | Example 26 | Example 62 |
| | | 60 | Example 9 | Example 45 | Example 27 | Example 63 |
| Ar + $O_2$ (Gas Flow Rate 2:1) | 10 | 10 | Example 10 | Example 46 | Example 28 | Example 64 |
| | | 20 | Example 11 | Example 47 | Example 29 | Example 65 |
| | | 60 | Example 12 | Example 48 | Example 30 | Example 66 |
| | 20 | 10 | Example 13 | Example 49 | Example 31 | Example 67 |
| | | 20 | Example 14 | Example 50 | Example 32 | Example 68 |
| | | 60 | Example 15 | Example 51 | Example 33 | Example 69 |
| | 40 | 10 | Example 16 | Example 52 | Example 34 | Example 70 |
| | | 20 | Example 17 | Example 53 | Example 35 | Example 71 |
| | | 60 | Example 18 | Example 54 | Example 36 | Example 72 |

EXAMPLES 55 through 72

Examples 55 through 72 according to the second embodiment of this invention were manufactured in similar sputtering conditions except that the nonmagnetic base 10 was heated at 100° C. on sputtering the protection layer 40. From this fact, it is readily understood that Examples 55 through 72 correspond to Examples 37 through 54, respectively, as shown in Table 1.

COMPARATIVE EXAMPLE 1

Figure 3:
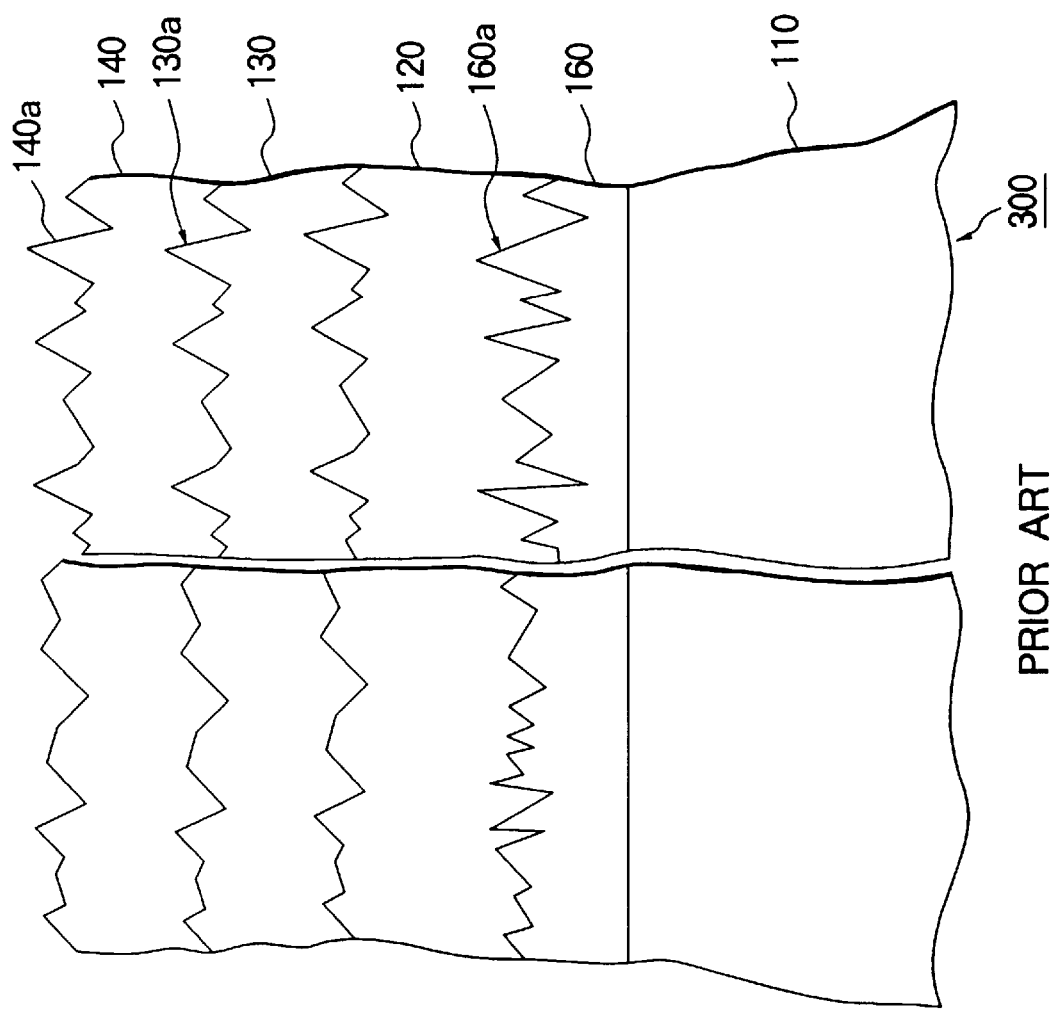
FIG. 3 is a sectional view of a portion of a magnetic recording medium obtained according to Comparative Example.

Referring to FIG. 3, a magnetic recording medium 300 according to Comparative Example was prepared in the following manner. A substrate 110 of 65 mm in diameter made of an aluminum alloy or aluminum was subjected to electroless plating to form a NiP plated layer 160 of 15 μm thick on the surface of the substrate 110. The NiP plated layer 160 was subjected to mechanical texturing with a lapping tape to form a textured surface 160a. Subsequently, the NiP plated layer 160 was covered with a Cr underlying layer 120 of 100 nm thick, a CoNiCr magnetic layer 130 of 50 nm thick, and a protection layer 140 of 20 nm thick made of partially-stabilized zirconia formed on the magnetic layer 130. The deposition conditions for the individual layers are similar to those described above.

Surface Roughness

Surface roughness of the individual layers was measured at various steps of manufacturing Examples and Comparative Example.

(1) Qualitative Observation with a Scanning Electron Microscope

In all of Examples illustrated in FIGS. 1 and 2, any protrusions were scarcely observed on both an upper surface 30a of the magnetic layer 30 (FIG. 1) laid under the protection layer 40 and an upper surface 50a of the glass-like layer 50 which acts as the intermediate layer (FIG. 2). These upper surfaces might be regarded as being substantially smooth.

On the contrary, irregularities were found on an upper surface 130a of the magnetic layer 130 (FIG. 3) laid under the protection layer 140 in Comparative Example. These irregularities which were similar to those on the textured surface 160a has deep notches and high peaks and sharpened in configuration. In addition, these peaks and notches were irregular in shape.

It was observed that the upper surface 40a of the protection layer 40 (surface of the magnetic recording medium) in Examples had relatively small protrusions and the protrusions were generally semicircular in shape and were projected almost uniformly. In particular, when the glass-like layer 50 is laid as the intermediate layer like in Examples 37 to 72, observation was made about the semicircular protrusions that were very fine and that were increased in number within a unit area.

This differs from the upper surface 140a of the protection layer 140 in Comparative Example, as mentioned before.

(2) Quantitative Observation due to Roughness Measurement Apparatus of a Stylus type.

Table 2 shows surface roughness obtained from the measurements on the upper surface 40a of the magnetic layer 40 (Examples 1 through 36), the upper surface 50a of the glass-like layer 50 (Examples 37 through 72), the upper surface 40a of the protection layer 40, and the textured surface 160a and the upper surface 140a of the protection layer in Comparative Example. The measurements were obtained by using a roughness-measuring apparatus (Talystep sold by Rank Taylor Hobson, Co. in England) which has a pyramid-shaped probe or stylus of 0.1×2.5 μm. In this event, a measuring load became equal to 2 mgf and a probe or stylus scanning rate became equal to 2.5 μm/s.

The value $R_{max}$, $Zi$, and $\sigma_{Zi}$ in Table 2 are obtained on the basis of predetermined criteria. These criteria will be described with reference to FIG. 4 to clarify the relationship between the tribological properties on HDI and these criteria.

Figure 4:
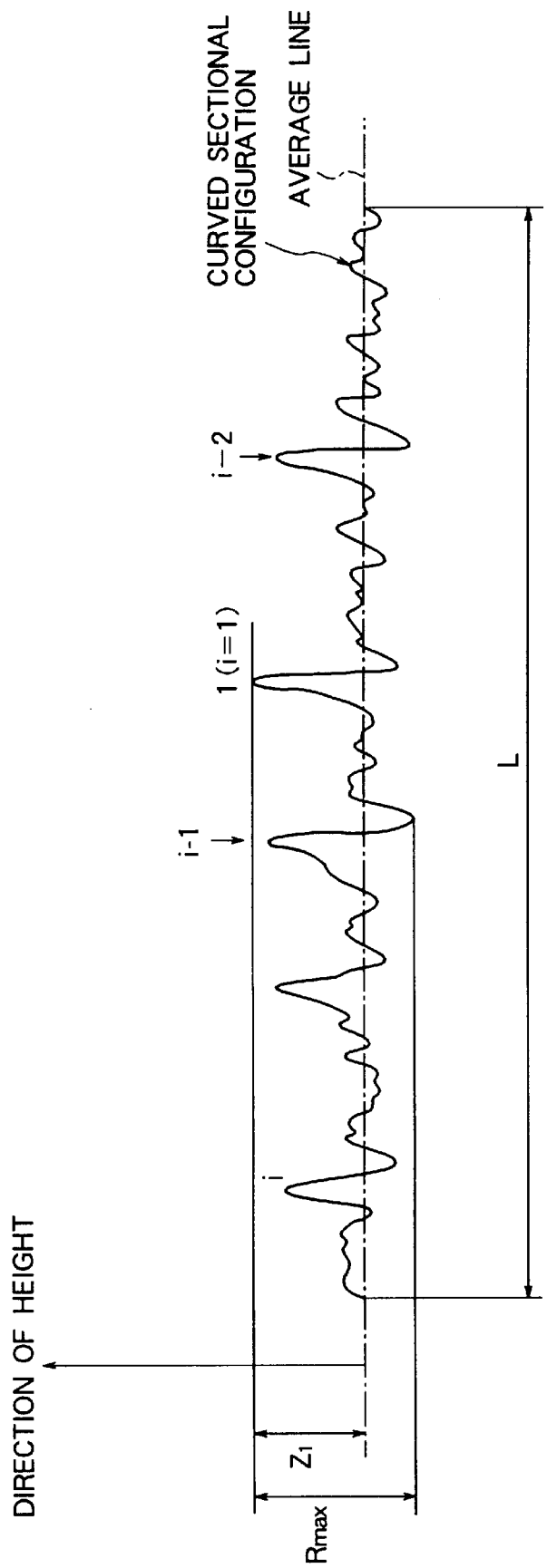
FIG. 4 is a view illustrating the surface of the recording medium in cross section for use in describing a surface roughness of the magnetic recording media obtained according to Examples and Comparative Examples.

The surface roughness $R_{max}$ is specified by the "maximum height" prescribed by Japanese Industrial Standard (JIS) B0601. In FIG. 4, only a part of the curved sectional configuration or outline is drawn over a reference length L and may be called a sampled portion or a measurement region. The sampled portion is interposed by two parallel lines which are parallel to an average or a reference line. A distance between these two parallel lines is measured in a vertical direction of the curved sectional configuration and is representative of a maximum height of the surface roughness. It is preferable that the reference length L is equal to the ABS width of the head slider that contacts with the recording medium. The refernece length typically falls within a range between 50 and 500 μm, and is equal to 240 μm in the illustrated example.

TABLE 2

SURFACE ROUGHNESS (unit: nm)

| | Zi | $\sigma_{Zi}$ | | Zi | $\sigma_{Zi}$ |
|---|---|---|---|---|---|
| Example 1 | 5.0 | 0.51 | Example 37 | 4.0 | 0.21 |
| Example 2 | 7.0 | 0.54 | Example 38 | 6.5 | 0.35 |
| Example 3 | 45.0 | 3.00 | Example 39 | 38.0 | 2.70 |
| Example 4 | 5.5 | 0.54 | Example 40 | 4.5 | 0.30 |
| Example 5 | 9.7 | 0.70 | Example 41 | 7.0 | 0.51 |
| Example 6 | 51.0 | 4.30 | Example 42 | 43.0 | 3.30 |
| Example 7 | 5.4 | 0.80 | Example 43 | 4.9 | 0.41 |
| Example 8 | 9.6 | 0.85 | Example 44 | 8.3 | 0.65 |
| Example 9 | 52.0 | 4.70 | Example 45 | 46.0 | 4.00 |
| Example 10 | 6.2 | 0.60 | Example 46 | 3.9 | 0.20 |
| Example 11 | 13.2 | 0.65 | Example 47 | 6.0 | 0.31 |
| Example 12 | 37.0 | 2.00 | Example 48 | 30.0 | 1.60 |
| Example 13 | 6.5 | 0.59 | Example 49 | 4.3 | 0.27 |
| Example 14 | 14.0 | 0.65 | Example 50 | 6.1 | 0.49 |
| Example 15 | 41.0 | 3.00 | Example 51 | 35.0 | 2.30 |
| Example 16 | 6.5 | 0.87 | Example 52 | 4.8 | 0.37 |
| Example 17 | 14.9 | 0.95 | Example 53 | 7.9 | 0.60 |
| Example 18 | 45.0 | 3.90 | Example 54 | 39.0 | 3.00 |
| Example 19 | 5.4 | 0.70 | Example 55 | 4.5 | 0.30 |
| Example 20 | 8.3 | 0.90 | Example 56 | 7.4 | 0.50 |
| Example 21 | 51.0 | 5.10 | Example 57 | 45.0 | 4.30 |
| Example 22 | 7.1 | 0.80 | Example 58 | 5.1 | 0.40 |
| Example 23 | 12.0 | 1.10 | Example 59 | 8.3 | 0.76 |
| Example 24 | 52.2 | 5.20 | Example 60 | 47.0 | 4.90 |
| Example 25 | 6.8 | 1.10 | Example 61 | 6.1 | 0.60 |
| Example 26 | 17.0 | 1.30 | Example 62 | 9.4 | 0.90 |
| Example 27 | 55.0 | 5.70 | Example 63 | 51.0 | 5.10 |
| Example 28 | 8.1 | 0.75 | Example 64 | 4.5 | 0.36 |
| Example 29 | 15.0 | 1.50 | Example 65 | 7.1 | 0.51 |
| Example 30 | 50.0 | 4.90 | Example 66 | 46.0 | 4.30 |
| Example 31 | 7.3 | 0.80 | Example 67 | 4.8 | 0.35 |
| Example 32 | 14.5 | 1.10 | Example 68 | 7.2 | 0.80 |
| Example 33 | 51.0 | 5.20 | Example 69 | 51.0 | 5.10 |
| Example 34 | 10.0 | 1.50 | Example 70 | 5.1 | 0.60 |
| Example 35 | 15.1 | 1.60 | Example 71 | 8.5 | 1.10 |
| Example 36 | 53.0 | 5.40 | Example 72 | 52.0 | 5.20 |
| Comparative Example 1 | 60.0 | 7.0 | | | |
| Magnetic layer (substrate not heated) | 2.9 ($R_{max}$) | 0.20 | | | |
| Magnetic layer (substrate heated) | 2.9 ($R_{max}$) | 0.20 | | | |
| Intermediate layer (substrate not heated) | 2.7 ($R_{max}$) | 0.10 | | | |
| Intermediate layer (substrate heated) | 2.7 ($R_{max}$) | 0.10 | | | |
| Aluminum Substrate | 60.0 | 5.5 | | | |

Herein, the curved sectional outline is specified by a curve which is drawn by a stylus moving along the configuration or outline of the irregularities of the surface. In other words, the curved sectional configuration corresponds to a sectional configuration which is outlined by pits and protrusions when the measured surface is cut by a plane perpendicular to an average plane of the measured surface. The average line used herein may be defined as a straight or curved line which includes a nominal contour within the sampled portion L (L is equal to 240 μm herein) and which is determined by rendering square sums of deviations between the average line and the sectional outline minimum.

Further, $\sigma_{Zi}$ is a standard deviation of Zi and represented by the following equation:

$$\sigma_{Zi} = \sqrt{\sum_{i=1}^{n} (Zi - \overline{Zi})^2 / n}$$

-continued $$\overline{Zi} = \sum_{i=1}^{n} Zi/n$$

where Zi is a distance (or height) between the average line and the top of the peak of the sectional outline, where i is a positive integer 1, 2, 3, 4, . . . , n. The positive integer "i" becomes equal to n "1" at a maximum height and the remaining integers "2" to "n" are successively assigned in the order of heights. As a result, the lowest height of the peaks is assigned to "n" and the lowest peak is represented by Zn. It is preferable that n is determined in consideration of an amount of crowning and the reference length (L) of the ABS of the head slider. In the example, the value of $\sigma_{Zi}$ is calculated as n=10.

As is apparent from Table 2, the surface roughness of the upper surface of the protection layer can readily be controlled within a desired range even by the use of a typical deposition method, such as sputtering, which results from smoothing the surface of the magnetic layer or the glass-like layer to $R_{max}$ of 3 nm or less. In addition, a variation of the irregularities of the surface becomes small. This is particularly true in the examples with the glass-like intermediate layer (Examples 37 through 72). Thus, the maximum height surface roughness $R_{max}$ does not exceed 3 nm on the surface laid under the protection layer even when the base is heated at around 100° C.

On the contrary, in the conventional Comparative Example having a textured substrate, the surface condition of the protection layer is referenced by the textured surface having irregular protrusions defined by large, sharp peaks and valleys. This surface is seriously unsuitable for achieving a low floating height and satisfactory head crash properties.

The present inventors have found out that the above-mentioned parameters Z1 and $\sigma_{Zi}$ for the surface roughness have a strong correlation with the floating characteristics of the head slider and with the coefficient of friction which serves as a factor evaluating the tribological properties on the HDI. It would be apparent for those skilled in the art that various parameters can be used to define the irregularities of a surface including parameters for the surface roughness prescribed by JIS B0601 (average roughness, maximum height roughness, and ten-point average roughness).

Figure 5:
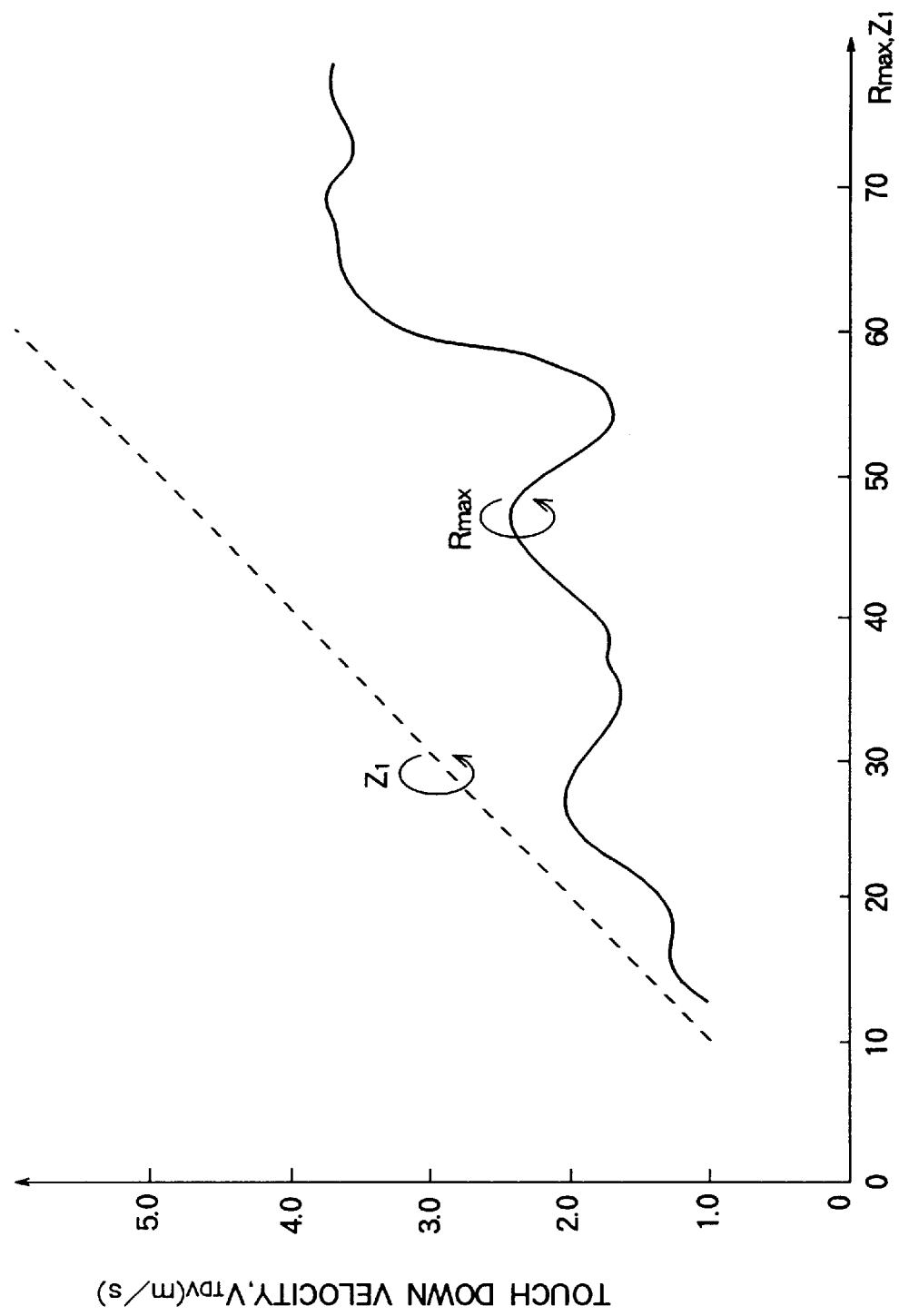
FIG. 5 is a graph illustrating parameters of the surface roughness ($R_{max}$, Z1) as a function of a relative velocity ($V_{TDV}$)

Let the parameters Z1 and $\sigma_{Zi}$ proposed by the present inventors be replaced by the maximum height roughness ($R_{max}$) and square means roughness (RMS). Taking this into consideration, the present inventors had determined a relation between the floating characteristics of the head slider and the parameters Z1 and $R_{max}$. The result is shown in FIG. 5. This figure shows these parameters as a function of a relative velocity ($V_{TDV}$). More specifically, a test device with an acoustic emission (AE) sensor was used for sensing contacting state between the head slider and the medium. The head slider is kept at a certain height over the medium and then the relative velocity between the head slider and the medium was decreased gradually. In other words, the floating height was reduced to indicate the relation between the parameters for the surface roughness and the relative velocity at the time when the head slider first contacts with the medium. As a result, it is found that the relative velocity $V_{TDV}$ monotonically increases relative to the parameter Zi, indicating a clear correlation therebetween.

On the contrary, the parameter $R_{max}$ exhibited less correlation with the relative velocity $V_{TDV}$. This might result from the fact that Zi depends only on the protrusions on the surface while $R_{max}$ is affected by the pits in the surface. More specifically, only the protrusions might affect directly the contact state between the head slider and the medium. Accordingly, the elimination of information associated with the pits clearly exhibits the above-mentioned effect.

Figure 6:
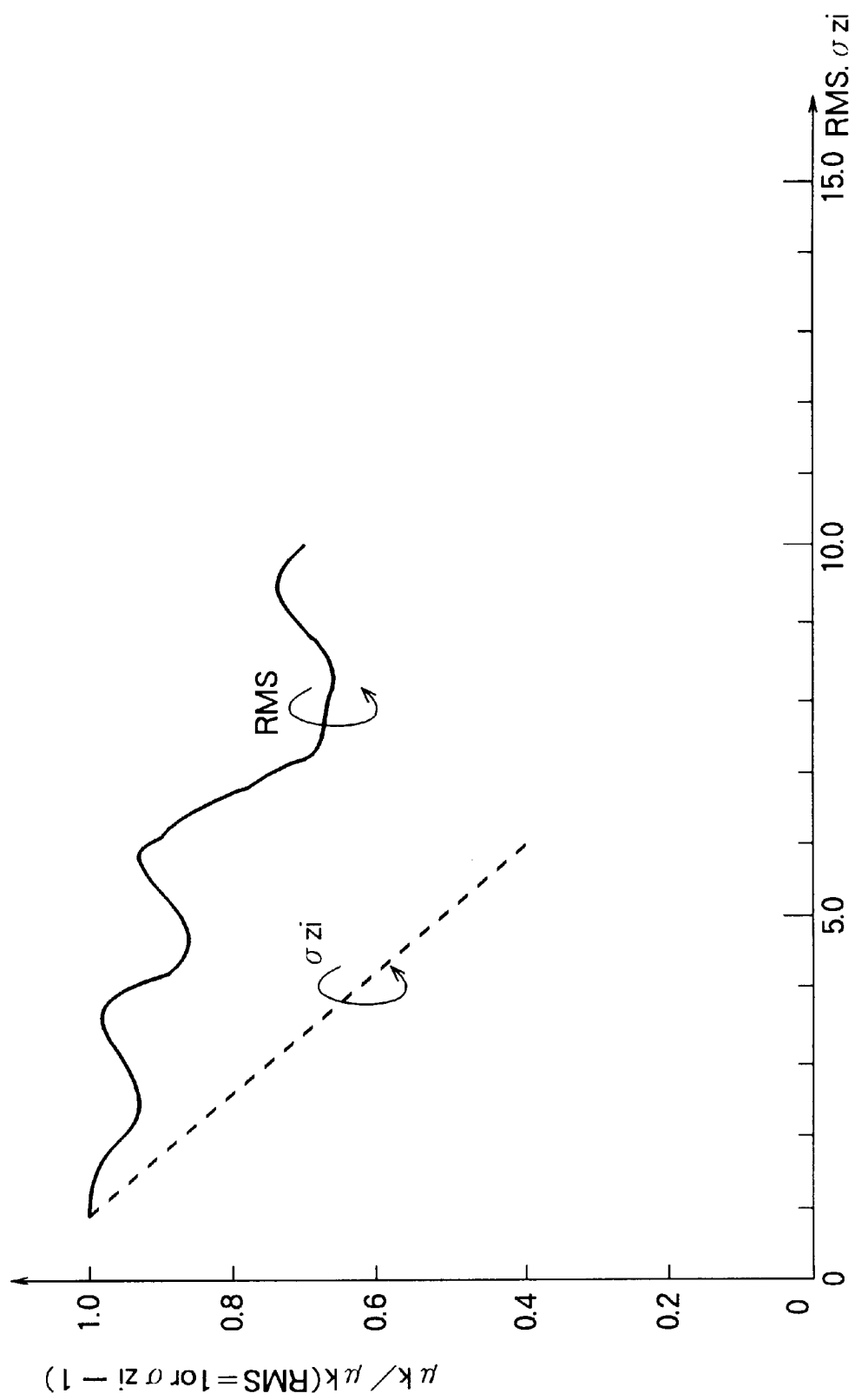
FIG. 6 is a graph illustrating parameters of the surface roughness ($\sigma_{Zi}$ and RMS) as a function of a dynamic coefficient of friction ($\mu k$)

A dynamic coefficient of friction at HDI was also determined with respect to the parameters $\sigma_{Zi}$ and RMS. The result is shown in FIG. 6. To consider only the standard deviation of the protrusions on the surface provides a close relation between the irregularities of the surface and the tribological properties at HDI, which made it difficult to be represented by the parameters proposed earlier.

Figure 7:
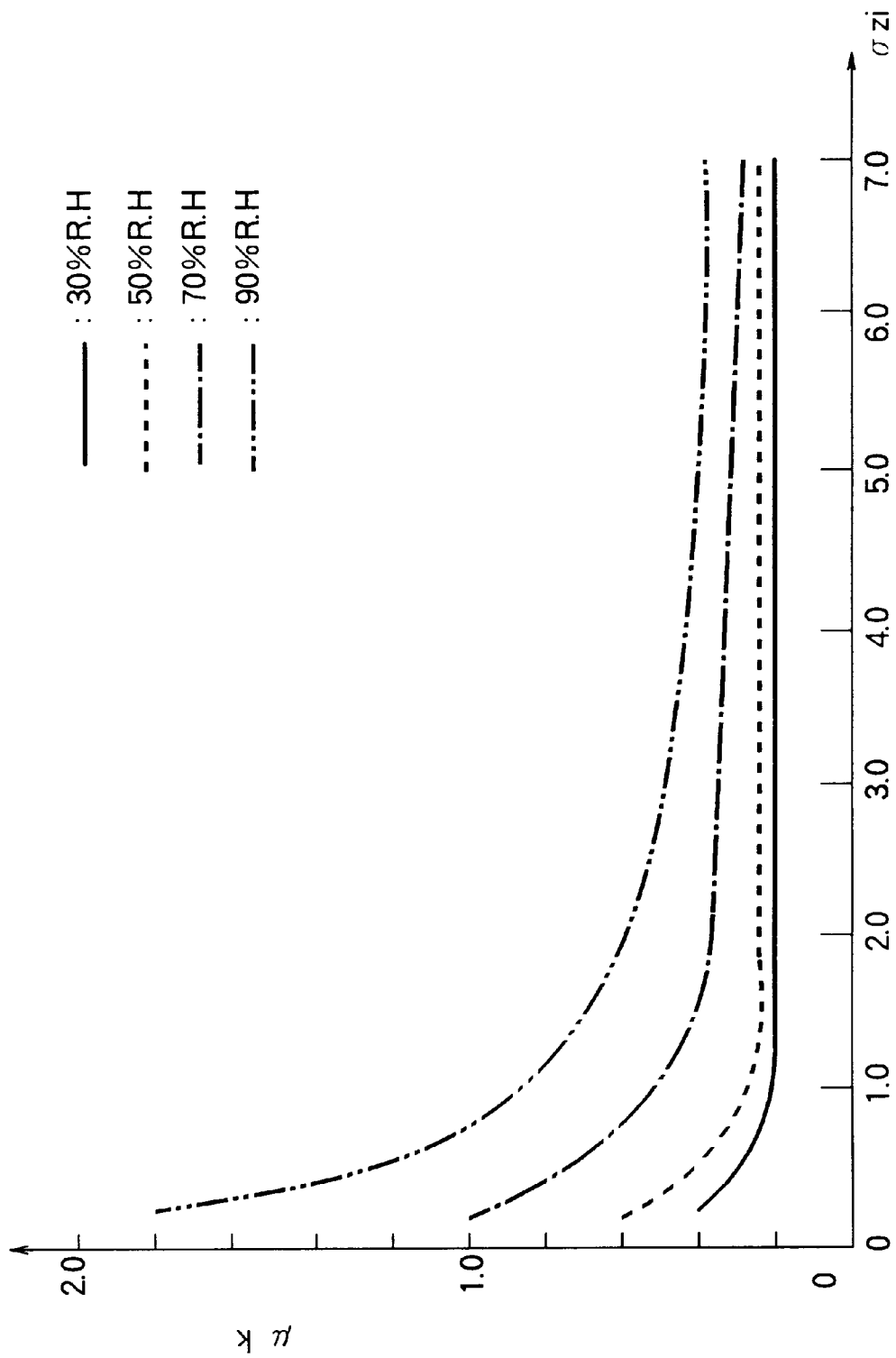
FIG. 7 is a graph illustrating a relative humidity (RH) as a function of a dynamic coefficient of friction ($\mu k$)

FIG. 7 is a graph illustrating a relative humidity as a function of the dynamic coefficient of friction (hereinafter referred to as an initial dynamic coefficient of friction; $\mu$k) in the Examples illustrated in FIGS. 1 and 3 and the Comparative Example 1 of a conventional art. The relative humidity and the initial dynamic coefficient of friction were determined with a commercially available friction/wear tester for a magnetic recording medium placed in a thermo-hygrostat.

The friction/wear tester for a magnetic recording medium used comprises a strain gauge sensor to determine a frictional force between the head slider and the medium. The value of the frictional force is divided by a load applied to the head slider by means of a suspension (hereinafter, referred to as a head load). The calculation result is defined as the dynamic coefficient of friction. In this event, the medium is mounted on a rotary spindle of the friction/wear tester at a tightening torque of 1.5 kgfcm. The head slider is mounted over the medium such that the center of an inner air bearing surface (ABS) is 17.5 cm away from the center of the medium. Once the inside of the thermo-hygrostat reaches a predetermined temperature, the head slider is kept over the medium and the medium is rotated three turns at 1 rpm for thirty seconds. During the rotation of the medium, the frictional force between the head slider and the medium is sensed by the strain gauge sensor. The strain gauge sensor produces a sensor signal indicative of the sensed frictional force. The value of the frictional force is converted into a voltage and the sensor signal is provided as an analog sensor signal. The sensor signal is supplied to a personal computer where it is sampled and quantized at a sampling frequency of 1 kHz. The frictional force for each sampling duration is stored in an internal memory of the computer. An arithmetical mean of these frictional forces is calculated, and the calculation result is divided by the head load to obtain the dynamic coefficient of friction ($\mu$k).

The strain gauge sensor is moisture-proofed to prevent an output signal from being changed depending on the change in humidity. The head used for the present measurement is an in-line head, IBM 3370. The head load is 6.5 gf and the head slider is made of $Al_2O_3$-TiC. The inside of the thermo-hygrostat is kept at a cleanness of 100. In the Examples of the present invention, it has been found that the increase in relative humidity tends to be followed by the dynamic coefficient of friction $\mu$k which is significantly increased particularly at a region where $\sigma_{Zi}$ is small. The value of $\sigma_{Zi}$ at which the dynamic coefficient of friction $\mu$k starts to increase becomes large as the relative humidity is increased. A possible cause for this is that a larger $\sigma_{Zi}$ value decreases an actual contact area at HDI, alleviating an effect of meniscus due to the water present at HDI. In addition, the variation of $\sigma_{Zi}$ is limited to the smaller range in Examples 37 through 72 (the protection layer is deposited on the glass-like intermediate layer) as compared with Examples 1 through 36 (the protection layer is deposited on the magnetic layer). Examples 37 through 72 are effective in reducing the dynamic coefficient of friction $\mu k$ particularly in a low humidity region having a relative humidity of 50% RH or lower.

Figure 8:
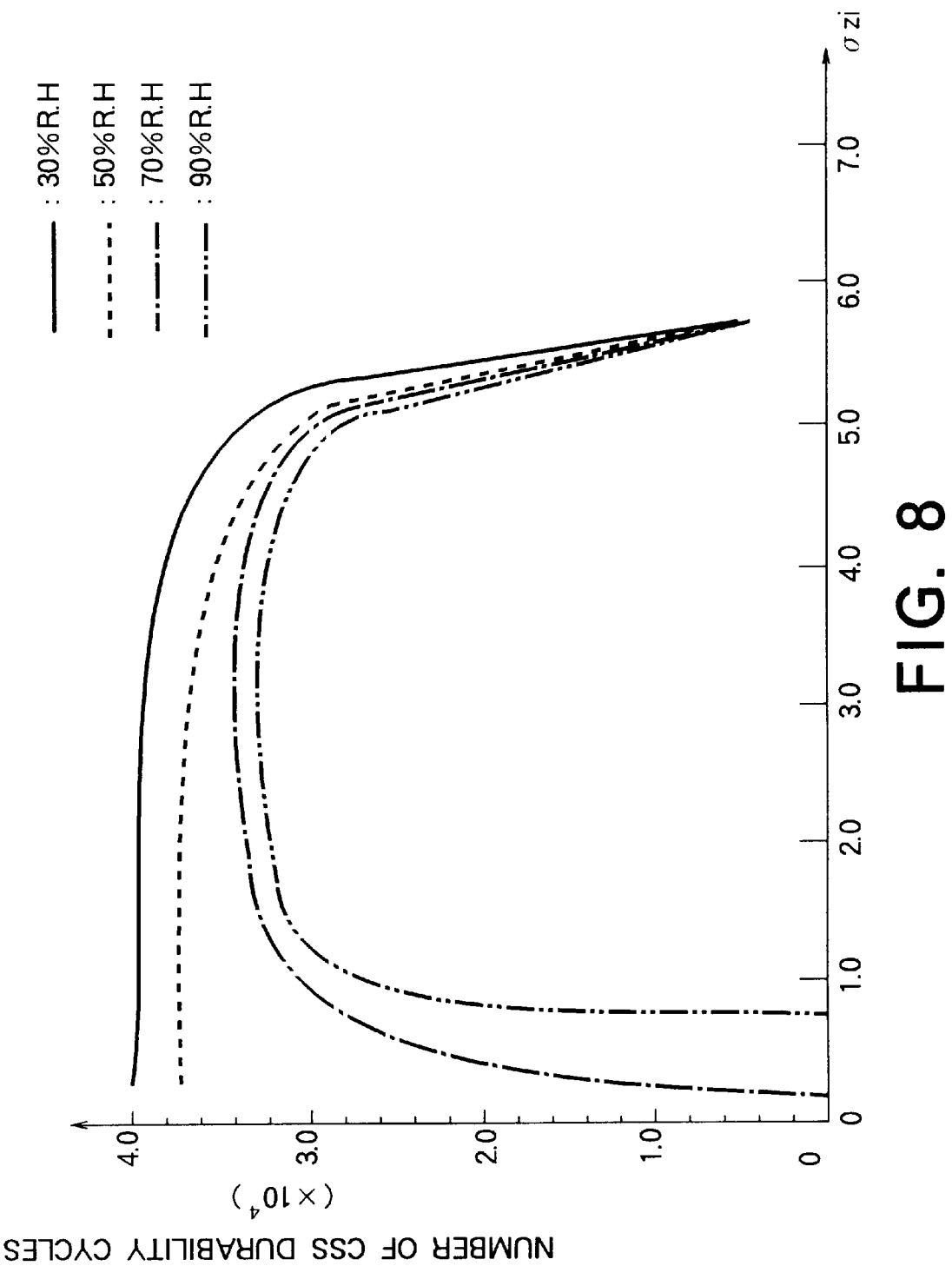
FIG. 8 is a graph illustrating a relative humidity (RH) as a function of CSS durability in Examples and Comparative Examples.
Figure 9:
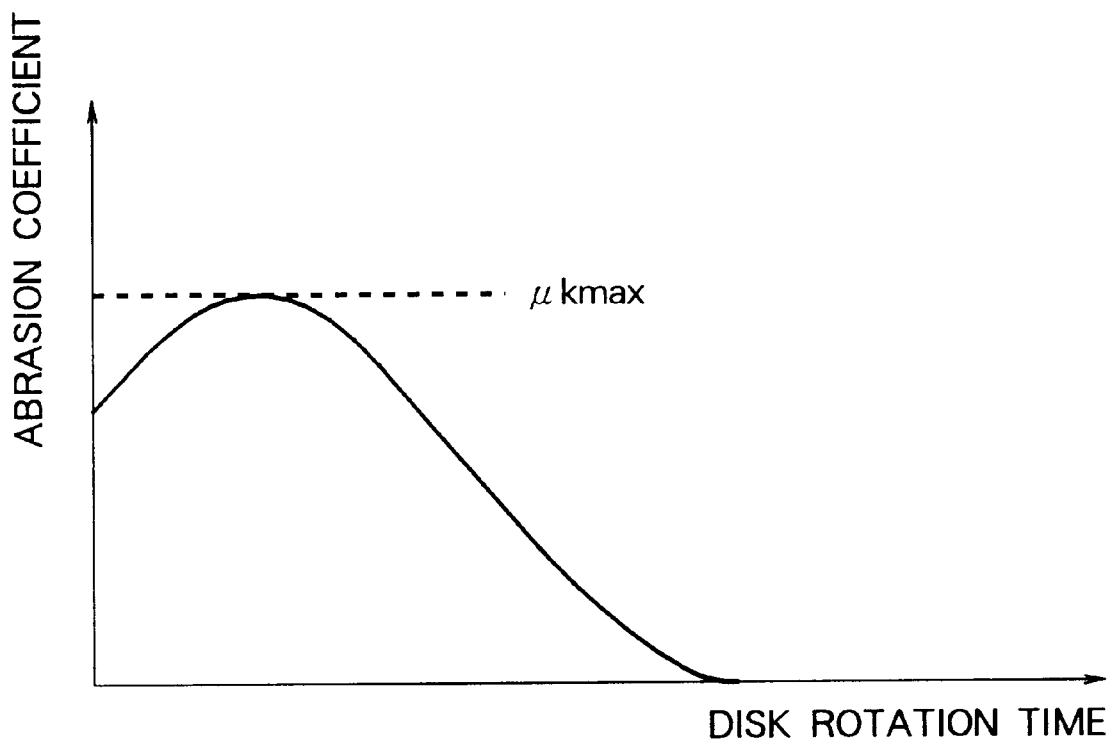
FIG. 9 is a view illustrating floating characteristic of a head slider.

FIG. 8 is a graph illustrating a relative humidity as a function of CSS durability. More specifically, this figure illustrates the result of a CSS durability test conducted on the magnetic recording media obtained in Examples 1 through 72 and Comparative Example 1 under relative humidity conditions similar to those used in measuring the above-mentioned initial dynamic coefficient of friction. This test was conducted by using a friction/wear tester and a head slider similar to those used in measuring the above-mentioned initial dynamic coefficient of friction. In this test, the head slider is mounted over the medium such that the center of an inner air bearing surface (ABS) is 17.5 cm away from the center of the medium. Once the inside of the thermo-hygrostat reaches a predetermined temperature, CSS operations (lifting and landing of the head slider from and on the medium) were repeated according to a pattern illustrated in FIG. 9. A value of $\mu k max$ was obtained automatically by using a computer at each CSS cycle from the change of the coefficient of friction observed during the head slider is floated over the medium relative to the rotation time of the disk (slider floating curve; see FIG. 9), and the data obtained was stored. The number of CSS durability cycles is defined as the CSS number of cycles at the time when the coefficient of friction exceeds 1.0.

As a result, following results were obtained. The number of CSS durability cycles is reduced as the $\sigma_{Zi}$ value increases in the low humidity region with a relative humidity of 50% or lower. The number of the durability cycles is significantly reduced particularly when $\sigma_{Zi}$ is smaller than 5 nm. On the other hand, the number of the CSS durability cycles is increased as the $\sigma_{Zi}$ increases in the high humidity region with a relative humidity kept at a value higher than 50%. The characteristic curve exhibited a peak around $\sigma_{Zi}$=4 nm, which was then decreased again. The number of the durability cycles is significantly reduced from around $\sigma_{Zi}$>5 nm. The latter tendency greatly depends on the amount of water adsorbed at HDI. The dynamic coefficient of friction $\mu k$ is reduced in the region where the CSS durability is improved as the $\sigma_{Zi}$ value is increased because the meniscus effect is alleviated in this region as a result of the reduction in actual contact area. The durability is improved accordingly. Once the number of the durability cycles reaches a peak value the surface pressure imposed to a single protrusion on the medium is increased. A damage of the medium is thus more likely to be induced due to the increased surface pressure. This is particularly true when the $\sigma_{Zi}$ value is larger than 5 nm.

As mentioned above, advantages and features of the present invention are clearly found through the tests on the initial dynamic coefficient of friction and the CSS durability. It is preferable to use a magnetic recording medium having a $\sigma_{Zi}$ which is equal to or smaller than 5 nm in the low humidity region of 50% or lower in relative humidity. It is also preferable to use a magnetic recording medium having the surface roughness of $\sigma_{Zi}$<1 nm to achieve a desired floating height of the head slider in the low humidity region of 50% or lower in relative humidity. On the other hand, it is preferable to use a magnetic recording medium having a surface roughness in the range of 1 nm<$\sigma_{Zi}$<5 nm in the high humidity region where the relative humidity is higher than 50%.

While the above Examples have thus been described in conjunction with the protection layer formed as a single layer, the protection layer may be a laminate of two or more layers. For example, the protection layer 40 of zirconia may be provided with a layer or layers of carbon, metal oxide, carbide, or/and nitride. In such a case, only the outermost layer, i.e., the layer serving as the surface of the magnetic recording medium is required to have the above-mentioned desired surface roughness. A lubricant layer may be provided on the protection layer, which further improves the durability.

When the protection layer and/or the intermediate layer are formed through the RF magnetron sputtering, an abrasion resistance may further be improved by heating the substrate or by applying a bias voltage to the substrate. In this event, each layer of the magnetic recording medium may be formed of any one of conventional methods inasmuch as the above-mentioned desired surface roughness is obtained. Examples of such methods include other sputtering, vacuum deposition, spraying, chemical vapor deposition, dipping, and spin coating.

The substrate may be made of glass other than $SiO_2$ such as silicate-based glass, borate-based glass, phosphate-based glass, and germate-based glass. A material of the substrate is not limited to glass and may be an AL alloy, ceramic, plastic, or carbon as long as a significantly smooth surface can be obtained.

The magnetic layer may be formed of Co-based material other than CoNiCr, such as CoCrTa, CoCrPt, and CoPtNi. Alternatively, the magnetic layer may be a non Co-based layer.

As apparent from the above, in the present invention, the upper surface has a maximum height surface roughness of 3 nm or smaller. In addition, the distance Zi on the upper surface of the protection layer is in the range from 5 nm to 50 nm. As a result, the stiction and the head crash can be avoided effectively while providing a small floating height of the head slider. In addition, the combination of this surface roughness and the distance Zi provides a magnetic recording medium readily obtained through industrial production. Moreover, the height of the protrusion on the protection layer is 5.7 nm or smaller in the standard deviation ($\sigma_{Zi}$) of the distance Zi. As a result, the stiction is restricted more effectively to improve the wear resistance of the medium significantly, providing the durability for a long term usage. The above-mentioned advantages are enhanced when the protection layer is made of zirconia.

What is claimed is:

1. A magnetic recording medium for use in combination with a magnetic head, said magnetic recording medium having an outermost surface thereof and comprising a nonmagnetic substrate which has an untextured substrate surface, an outermost layer which defines said outermost surface, and an intermediate layer which is intermediate between said nonmagnetic substrate and said outermost layer and which is disposed in contact with both said outermost layer and said nonmagnetic substrate, said intermediate layer comprising a magnetic film;

said intermediate layer being deposited on said untextured substrate surface and having an upper surface which is brought into contact with said outermost layer and which has a first surface roughness not greater than 3 nm when the surface roughness is measured by the maximum height;

said outermost surface of said outermost layer having a second surface roughness which is specified by determining a reference surface and by calculating only protrusions from the reference surface with recesses omitted and which is independent of the substrate surface so as to avoid stiction of the magnetic head onto the uppermost surface;

said second surface roughness being defined by first and second parameters which are different from said maximum height and which are determined in relation to an average line which is obtained by cutting said outermost layer by a plane which is perpendicular to said outermost layer to detect a sectional outline of said outermost surface and by a calculation such that square sums between the sectional outline and a line drawn in the sectional outline becomes minimum;

said first parameter being calculated by measuring heights of the protrusions of the sectional line from the average line and falling within a first range between 5 nm and 60 nm while the second parameter is determined by calculating a standard deviation of said first parameter and is not greater than 5.7 nm;

said outermost layer comprising a protection layer which comprises zirconia.

2. A magnetic recording-medium as claimed in claim 1, wherein the standard deviation falls within a range between 1.0 nm and 5.7 nm.

3. A magnetic recording medium as claimed in claim 2, wherein the atmosphere is 50% or greater in relative humidity (RH).

4. A magnetic recording medium as claimed in claim 1, wherein the standard deviation is smaller than 1.0 nm.

5. A magnetic recording medium as claimed in claim 1, wherein the standard deviation is equal to or smaller than 1.0 nm in an atmosphere of 50% or lower in relative humidity (RH).

* * * * *